United States Patent
Jaentsch et al.

(10) Patent No.: US 10,971,987 B2
(45) Date of Patent: Apr. 6, 2021

(54) METHOD FOR OPEN-LOOP AND/OR CLOSED-LOOP CONTROL OF A LINEAR DRIVE, THE CONTROL DEVICE, A LINEAR DRIVE AND A SYSTEM

(71) Applicant: Siemens Aktiengesellschaft, Munich (DE)

(72) Inventors: Michael Jaentsch, Princeton, NJ (US); Maximilian Klaus, Gerlingen (DE); Gerhard Rastaetter, Gaertringen (DE); Robin Sailer, Leinfelden-Echterdingen (DE); Carsten Spindler, Remptendorf (DE); Csilla Szathmary, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 311 days.

(21) Appl. No.: 15/778,165

(22) PCT Filed: Nov. 15, 2016

(86) PCT No.: PCT/EP2016/077640
§ 371 (c)(1),
(2) Date: May 22, 2018

(87) PCT Pub. No.: WO2017/089167
PCT Pub. Date: Jun. 1, 2017

(65) Prior Publication Data
US 2018/0281140 A1 Oct. 4, 2018

(30) Foreign Application Priority Data

Nov. 24, 2015 (EP) .................................... 15196041
Nov. 24, 2015 (EP) .................................... 15196047
(Continued)

(51) Int. Cl.
*H02K 41/02* (2006.01)
*B65G 54/02* (2006.01)
(Continued)

(52) U.S. Cl.
CPC ............. *H02K 41/02* (2013.01); *B23Q 15/24* (2013.01); *B65G 37/00* (2013.01); *B65G 37/005* (2013.01);
(Continued)

(58) Field of Classification Search
CPC .......... H02K 41/02; H02P 25/06; G05B 19/19
(Continued)

(56) References Cited

U.S. PATENT DOCUMENTS 6,191,507 B1 2/2001 Peltier et al.
6,294,891 B1 * 9/2001 McConnell ............... G05B 5/01
318/560

(Continued)

FOREIGN PATENT DOCUMENTS

DE 102012025326 6/2014
WO WO2015/007342 1/2015

OTHER PUBLICATIONS

International Search Report for PCT/EP2016/077640 dated Feb. 23, 2017.

*Primary Examiner* — David Luo
(74) *Attorney, Agent, or Firm* — Cozen O'Connor

(57) ABSTRACT

A method for open-loop and/or closed-loop control of a linear drive, a linear drive; and a system, wherein the linear drive includes at least one segment, at least one rotor, at least one machine station and a control device, where the at least one rotor is moved in a direction via the at least one segment, at least a portion of at least one segment is within a region accessible by the machine station, the movement of the at least one rotor is controlled in an open-loop and/or closed-
(Continued)

loop manner by the control device and/or control unit, the controlling occurs in accordance with a movement pattern for the rotor, and where the movement of a particular rotor in the region accessible by the associated machine station is specified by a movement profile in accordance with the mode of operation of the associated machine station.

15 Claims, 4 Drawing Sheets

(30) Foreign Application Priority Data

| | | | |
|---|---|---|---|
| Nov. 24, 2015 | (EP) | ................................ | 15196077 |
| Mar. 21, 2016 | (EP) | ................................ | 16161433 |
| Mar. 21, 2016 | (EP) | ................................ | 16161436 |
| Mar. 21, 2016 | (EP) | ................................ | 16161437 |

(51) Int. Cl.
*G05B 19/19* (2006.01)
*B65G 37/00* (2006.01)
*H02P 25/06* (2016.01)
*B23Q 15/24* (2006.01)
*B65G 43/10* (2006.01)
*B65G 23/23* (2006.01)

(52) U.S. Cl.
CPC ............ *B65G 43/10* (2013.01); *B65G 54/02* (2013.01); *G05B 19/19* (2013.01); *H02P 25/06* (2013.01); *B65G 23/23* (2013.01); *G05B 2219/41327* (2013.01); *G05B 2219/41337* (2013.01); *G05B 2219/50229* (2013.01); *Y02P 90/02* (2015.11)

(58) Field of Classification Search
USPC ..................................................... 318/135, 34
See application file for complete search history.

(56) References Cited

U.S. PATENT DOCUMENTS 7,075,260 B2 * 7/2006 Maeda ................. H02P 27/045
318/268
7,208,898 B2 * 4/2007 Stoecker ................ G11B 5/596
318/443

* cited by examiner

METHOD FOR OPEN-LOOP AND/OR CLOSED-LOOP CONTROL OF A LINEAR DRIVE, THE CONTROL DEVICE, A LINEAR DRIVE AND A SYSTEM

CROSS-REFERENCE TO RELATED APPLICATIONS

This is a U.S. national stage of application No. PCT/EP2016/077640/filed Nov. 15, 2016. Priority is claimed on EP Application No. EP15196047 filed Nov. 24, 2015, EP Application No. EP15196041 filed Nov. 24, 2015, EP Application No. EP15196077 filed Nov. 24, 2015, EP Application No. EP16161436 filed Mar. 21, 2016, Application No. EP16161437 filed Mar. 21, 2016, and EP Application No. EP16161433 filed Mar. 21, 2016, the contents of which are incorporated herein by reference in their entirety.

BACKGROUND OF THE INVENTION

1. Field of the Invention

The invention relates to a method for open-loop and/or closed-loop control of a linear drive, a control device, and a system.

2. Description of the Related Art

Linear drives are used to convey workpieces and materials of all kinds, in particular from one machine station to another machine station. In the past, linear drives were primarily realized through conveyor belts. Modern linear drives comprise linear motors, in particular stators of linear motors. Linear drives comprise rotors, where the rotors are used for the transport of goods or workpieces.

In the case of a plurality of machine stations and linear motor stations, also referred to as segments, the open-loop and/or closed-loop control of the movement of the rotors is complex and is, at present, pre-calculated. The pre-calculation of the movement of the rotor of the linear drive is not, however, flexible when a machine station does not function properly.

SUMMARY OF THE INVENTION

In view of the foregoing, it is an object of the invention to provide a method for configuring the movement of rotors of a linear drive flexibly, a linear drive with such a control device and a system with such a linear drive.

In accordance with the method for the open-loop and/or closed-loop control of a linear drive, the linear drive comprises at least one segment, at least one rotor, at least one machine station and a control device.

The at least one rotor is moved in a direction using the at least one segment, whereat least a portion of at least one segment is in a region of influence of the machine station, the movement of the at least one rotor is controlled in an open-loop and/or closed-loop manner by the control device and/or a control unit, the controlling takes place in accordance with a movement pattern for the rotor, and where the movement of the particular rotor in the region of influence of the associated machine station is specified by a movement profile according to the mode of operation of the associated machine station.

1. Mode of Operation of the Linear Drive

The segments of the linear drive are preferably configured as linear motor stators. The segments comprise active elements such as coils and, optionally, permanent magnets. The rotors comprise at least one passive element, in particular a permanent magnet.

The respective rotor is moved through the interaction of the active and passive elements. The active elements are supplied with current/voltage by the control device or by separate control units.

The specification of the voltage or of the current for the respective segments is performed by the control device. The control device specifies the voltage or the current for the segments in accordance with the movement pattern for the rotors at the segments.

2. Determining the Movement Pattern

The movement pattern defines how the respective rotors are moved with the aid of the segments. Preferably the rotors move on the segments. The segments are arranged side-by-side. The segments form a course, where the rotors are moved along this course. A portion of the course is assigned to a machine station. This portion of the course is assigned to the corresponding machine station. The rotors that move on the portion of the course move in the region of influence of the machine station.

The movement of the respective rotor is determined by the movement pattern. The movement pattern comprises, for example, a location function (depending on a time) of the respective rotor and/or a speed function (depending on a location or a time).

The movement profile comprises the movement intended for the movement of the rotor in the region of influence of the associated machine station. The movement of the rotor is oriented to the function of the machine station. A movement profile for the respective machine station is specified by the user.

The rotors move in the region of influence of the machine station in accordance with the movement profile. Advantageously the movement profile is specified for a plurality of rotors. The movement profile can be specified by the machine station itself. Preferably, the movement profile for the control device is present, and the control device controls the movement of the rotor in an open-loop or closed-loop manner in accordance with the movement profile in the region of influence of the machine station.

The rotors move outside the machine station, as specified by the control device. Outside the region of influence of the respective machine station, the movement of the rotors is determined according to the available rotors and the need, at present or arising in future, for rotors by the machine stations.

Through the above-described method, a high flexibility in the movement of the rotors on the segments can be achieved, and a wide range of applications for a linear drive described here is thus opened up.

In an advantageous embodiment of the method, the respective movement profile is specified by the control device or by the corresponding machine station.

When the movement profile is specified by the machine station, the machine station adopts command priority over the movement of the rotors, while the rotors are located in the region of influence of the respective machine station. Advantageously, a movement controller that is assigned to the machine controller makes the movement profile available for the control device and/or the respective control unit.

Preferably, the respective movement profile of the control device is available, and the movement profile serves to determine the movement of the rotors that are located in the region of influence of the respective machine station.

In particular, a further increase in the flexibility of the movement of the rotors can be achieved through the last-mentioned embodiment.

In a further advantageous embodiment of the method, a plurality of rotors is transferred together into the region of influence of the respective machine station.

Usually in a machine station, a plurality of goods and/or a plurality of workpieces, positioned on respective rotors, are processed in one step. In order for the processing to run smoothly, it is therefore advantageous if this plurality is transferred into the region of influence of the machine station in one step.

The plurality is thus only made available or collected in front of the region of influence of the machine station. As soon as the machine station has the capacity to accept a plurality of rotors, these rotors are transferred together into the region of influence of the machine station.

Through the common transfer of a plurality of rotors, a simultaneous processing of a plurality of workpieces or of materials to be machined can advantageously be ensured.

In a further advantageous embodiment of the method, the movement of the rotors is specified by the control device.

In particular, the movement pattern and/or the movement profile are specified by the control unit. The movement of the rotors based on the movement profile within the region of influence of the machine station, and the movement pattern of the rotors outside the movement profile, occurs in accordance with the above embodiment of the method by the control device. The control device is used for the open-loop and/or closed-loop control of the movement of the rotors of the linear drive and, optionally, for the open-loop and/or closed-loop control of the respective machine station, in particular of the drives of the respective machine station.

In a further advantageous embodiment of the method, the movement of the respective rotor is determined during the operation of the linear drive.

The control device determines in accordance with the conditions present, such as positions of the respective rotors, state of the respective machine station, number of rotors available for a particular machine station, and/or current capacity of the respective machine station to accept rotors.

The movement pattern is determined in accordance with the above conditions in online operation (alternatively also referred to as on-the-fly determination). The movement pattern is continuously re-determined. The movement pattern can also be re-calculated in each case at short intervals, perhaps every second, based on the conditions present at the time.

The continuous re-calculation allows the movement of the rotors to be adapted to unforeseen events.

In a further advantageous embodiment of the method, the determination of the movement pattern occurs through at least the following steps:
a) determination of an available number of rotors that are available for the respective machine station,
b) determination of the capability of the corresponding machine station to accept an intended number of rotors,
c) if the available number of rotors is at least as great as the intended number of rotors, then a transfer of the intended number of rotors into the region of influence of the corresponding machine station occurs,
d) working through the movement profile of the rotors in the region of influence of the corresponding machine station, and/or
e) the rotors are transferred out of the region of influence of the machine station after the movement profile has been worked through.

In other words, an intended number of rotors is assembled in front of the respective machine station. If the intended number of rotors is available and the machine station has an acceptance capacity sufficient to take up the intended number of rotors, then a transfer of the rotors into the region of influence of the machine station occurs. The movement is specified by the movement profile in the region of influence of the machine station. When the movement profile has been worked through, the rotors are re-released from the region of influence of the respective machine station. The rotors that have been released are then available for a further machine station.

As a result of the above embodiment of the method, it is possible that the number and/or the position of the rotors can change during the operation of the linear drive. In operation, therefore, a machine station is only characterized by an intended number of rotors that can be accepted, and by an assigned movement profile.

After the rotors have passed through a machine station, a first portion of the rotors can be transferred to a further machine station or to a plurality of further machine stations.

Between the output of the rotors from one machine station and the acceptance of the rotors by another machine station, the rotors can be positioned in an intermediate region, or can be moved through the intermediate region. The intermediate region is a part of the linear drive that is not assigned to any machine station. In other words, the intermediate region is not under the influence of a machine station.

The intermediate region between the regions of influence of machine stations serves to store rotors that are output by a machine station and are accepted by another machine station.

The rotors can move like a swarm. For example, two rotors at a time can be moved with a space between each other or, starting from a spaced movement, can transfer one after another into an acceleration phase/breaking phase. In the intermediate region, the rotors can, furthermore, be positioned at an intended location. As soon as the associated machine station is ready to accept them, the respective rotors can be transferred into the region of influence of the corresponding machine station.

It is possible, through the embodiment of the method described above, to remove individual rotors from the linear drive or to add them to the linear transport, without the pattern of the system being disturbed.

In a further advantageous embodiment, a reduced number of rotors is transferred in step c) into the region of influence of the machine station if a predetermined waiting time has elapsed and where in step d), a modified movement profile is performed by the rotors.

Particularly in the case of a malfunction of a machine station and/or a malfunction of the linear drive, it would be possible for a longer period of time to pass before the intended number of rotors are made available, without the intended number of rotors being transferred into the region of influence of a machine station. This disadvantageously leads to delays in the movement pattern.

To avoid a delay, the system can wait for a predetermined time (e.g., thirty seconds) for the intended number of rotors to be available. If only a reduced number of rotors is available after the time has elapsed, then the reduced number of rotors is transferred into the region of influence of the corresponding machine station. The rotors move in the region of influence of the corresponding machine station in accordance with a modified movement profile.

Rapid processing of workpieces or of materials for processing can be ensured by such an embodiment. Disadvantageous delays can, furthermore, be avoided.

In a further advantageous embodiment, the modified movement profile depends on the reduced number of rotors that are transferred into the region of influence of the machine station.

A respectively modified movement profile is made available to a respective reduced number of rotors. Thus, for example, with an intended number of six rotors for a machine station, a modified movement profile can be made available for five, four and three rotors.

For example, only a reduced number of four rotors is ready for transfer into the region of influence of a machine station after a period of time of 30 seconds. The four rotors are then transferred into the region of influence of the machine station. Each of the rotors passes through a modified movement profile for the four rotors. The four rotors are then re-output from the region of influence of the machine station, and further rotors are accepted into the machine station.

Through such an embodiment, a machine station can accept rotors into its region of influence without significant interruption, and can thus process the workpieces or materials for processing that are located on the rotors.

In a further advantageous embodiment of the method, the region of influence of the machine station is specified by segments that are assigned to the respective machine station.

The region of influence of the machine station is advantageously formed of segments that are located in the machine station. The processing of the workpieces or materials for processing advantageously occurs in the region of influence of the machine station.

The segments in the region of influence of the machine station are advantageously formed as (longitudinal) stators of linear motors.

In the region between the regions of influence, the segments are also advantageously formed as stators of linear motors.

Both the segments in the region of influence of the respective machine station as well as the segments outside the region of influence of the respective machine station are each controlled in an open-loop or closed-loop manner by a control unit or control device.

In an open-loop control of the movement of the rotors, the segment here is merely supplied with a voltage or with a current. In a closed-loop control of the movement of the rotors on the segments, the position and/or the speed of the rotors on the respective segment is advantageously determined, and the determined position and/or the determined speed is used as an input value for a closed control loop.

In a further advantageous embodiment of the method, the rotors are assembled outside the region of influence of the respective machine station.

After completion of a processing of workpieces or of the materials for processing, the rotors are released from the region of influence and/or are made available in some other manner for the corresponding machine station. A provision at a conveyor belt that is arranged in the region between the machine stations is also possible.

The rotors for the machine station are advantageously made available outside the machine station, but in the immediate surroundings of the machine station, in particular in front of the machine station or behind the machine station. When the rotors are taken into the region of influence of the machine station, the rotors are transferred from outside the region of the machine station into the region of influence of the machine station.

A transfer of the rotors into the region of influence of the machine station advantageously occurs from one side of the region of influence of the machine station.

Through a collection of the rotors outside the region of influence of the respective machine station, a simple determination of the number of rotors that are ready for the respective machine station can advantageously occur. This contributes to a rapid determination of the movement pattern.

In a further advantageous embodiment of the method, a succession of machine stations is assigned to the respective rotor, where the succession indicates the sequence in which the respective rotors pass through the machine stations.

Processing steps that are implemented in the corresponding machine stations can often be performed in a particular sequence.

For example, in a filling plant, the filling material must first be filled into the container in a first machine station, and only then can the container be closed in a further machine station. It is therefore necessary for a rotor that is provided to convey the container to pass through the first machine station and then through the further machine station(s). In other words, it is necessary that the rotors are first introduced to the region of influence of the first machine station and then to the region of influence of the second machine station.

It is also an object of the invention to provide a control device, where the control device is configured for a linear drive, and where the control device is provided for open-loop and/or closed-loop control of the method in accordance with the disclosed embodiments.

The control device advantageously comprises a movement controller or a programmable logic controller (PLC). The control device can be extended through further control units. The control units advantageously comprise power converters or current/voltage amplifiers. The control units are advantageously connected to one another through a data communication system. The control units advantageously serve to supply the segments with current or voltage in accordance with the specifications of the control unit. The control units are, furthermore, advantageously fitted with a closed-loop controller, such as a current regulator, a position regulator and/or a speed regulator.

It is also an object of the invention to provide a linear drive comprising at least one segment, one or a plurality of rotors, and a control apparatus. The linear drive optionally comprises a conveyor belt, where the conveyor belt is provided to transport the rotors from one segment to another segment. The control device also serves to determine the movement pattern. The control device can be implemented as a PLC or as a movement controller. The control device can also be implemented by a computer program product which is installed and able to run on a computing unit.

The segments are advantageously implemented as stators for linear motors. Control units which, in particular are implemented as power converters, serve to supply power or voltage to the segments.

It is also an object of the invention to provide a system which, in particular, is a machine tool, a production machine or a packaging machine. The system comprises at least one machine station and a linear drive as described above. The system is used preferably for machining materials to be processed or workpieces. The system is used, for example, for the manufacture and/or packaging of materials.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained below in more detail through figures. The forms of embodiment shown in the figures and their technical features can be combined by the expert to make new forms of embodiment of the invention, without leaving the scope of the invention, in which.

DETAILED DESCRIPTION OF THE EXEMPLARY EMBODIMENTS

Figure 1:
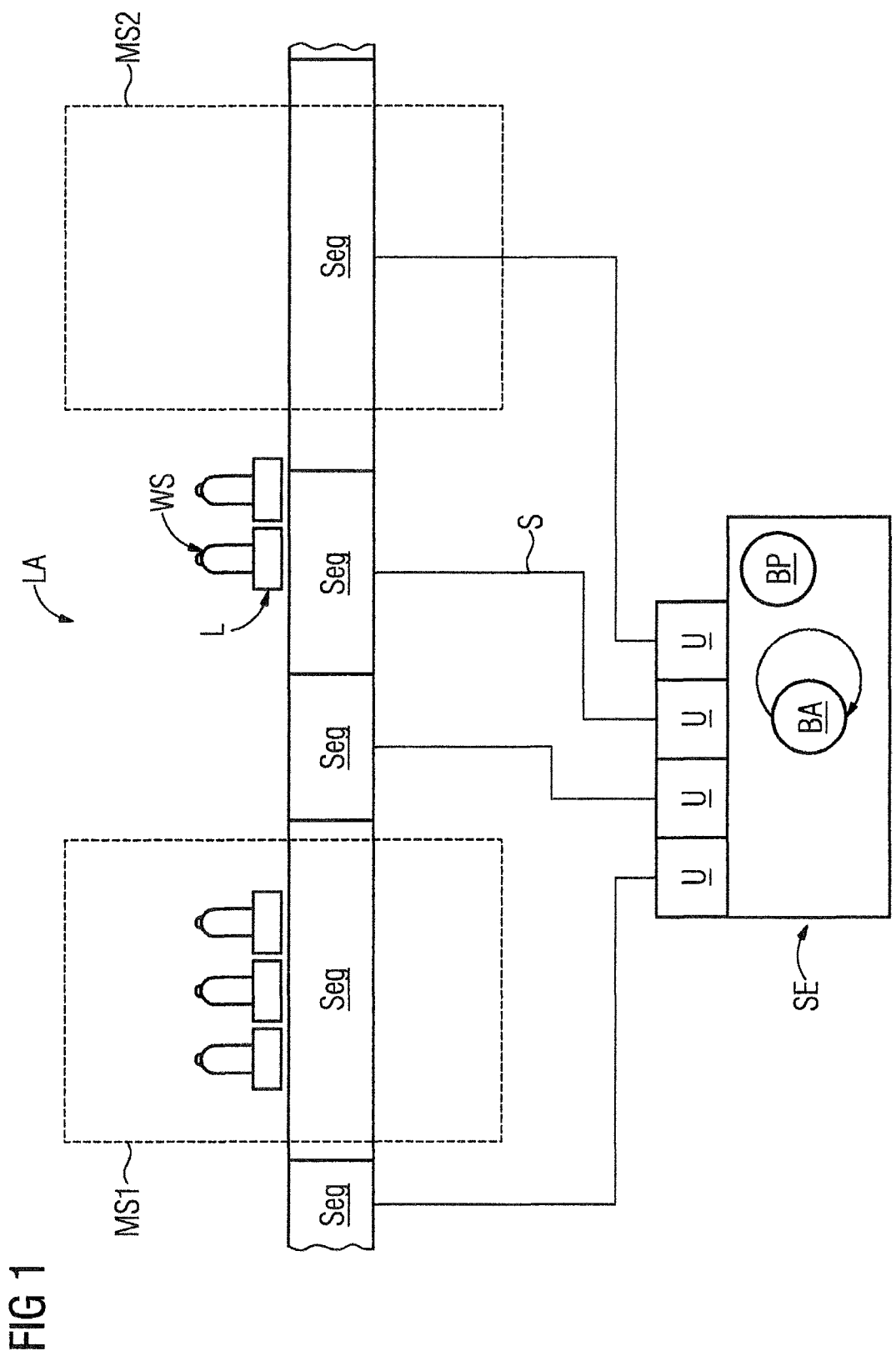
FIG. 1 shows a linear drive and two machine stations in accordance with the invention.

FIG. 1 shows a linear drive LA and two machine stations MS1, MS2. The linear drive LA comprises a control device SE, a plurality of control units U, segments Seg and rotors L. The rotors L move on the segments Seg. The segments Seg are each connected to a control unit U. The control units U are each connected to the control device SE. The control device SE is used to determine the movement pattern BA. Preferably, the movement pattern BA is re-determined or adjusted during the operation of the linear drive LA. The adjustment or re-determination is symbolized by the arrow in the control device SE.

The linear drive LA is used to transport rotors L from a first machine station MS1 to a second machine station MS2. The rotors are used to transport workpieces or materials for machining WS to the respective machine station MS1, MS2. Here, segment Seg is assigned to each of the machine stations MS1, MS2. The assigned segment Seg forms the region EB of influence of the respective machine station MS1, MS2.

The movement of the rotor L is controlled in an open-loop and/or closed-loop manner by the control device SE with reference to the movement pattern BA. Signals S are transmitted from the control device SE and/or the control unit U to the segment Seg for this purpose.

Advantageously, the movement is subject to closed-loop control within the respective region EB of influence of the machine station MS1, MS2, and to open-loop control outside the region of influence.

The movement of the rotors L within the region of influence of the respective machine station MS1, MS2 is specified by a corresponding movement profile BP. The movement profile BP can be present, in particular stored, in the control device SE.

In the present embodiment shown, three rotors L are moving in the first machine station MS1. Two further rotors L are waiting in front of the second machine station MS2.

In a further movement section (not illustrated), the three rotors L are output from the first machine station MS1. After this, five rotors L are ready for the further machine station MS2. A number of five rotors L provided for the second machine station MS2 can then be transferred into the region of influence of the second machine station MS2.

The first machine station MS1 is again free to accept the number N of three rotors L provided for the first machine station MS1.

Figure 2:
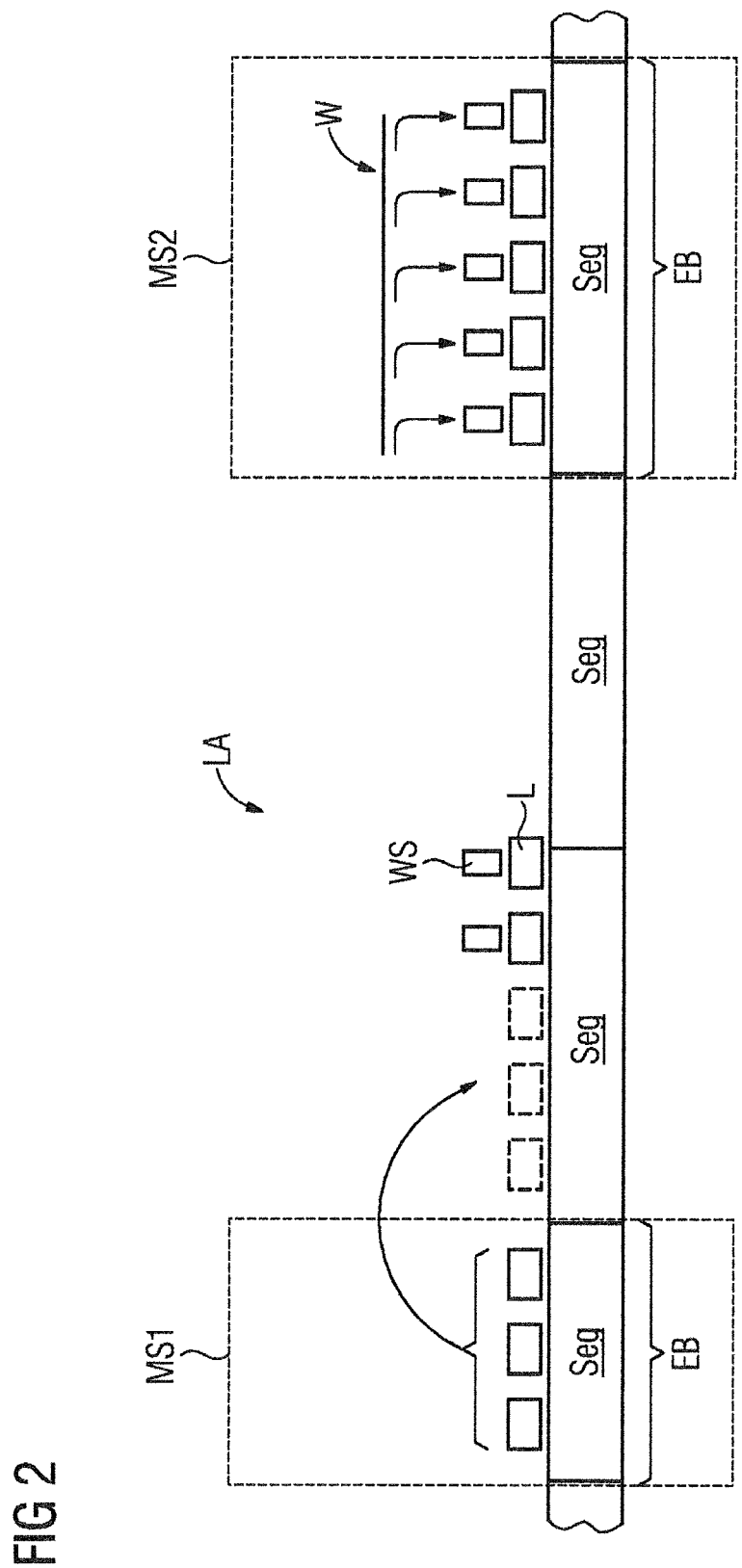
FIG. 2 shows rotors on a linear drive in accordance with the invention.

FIG. 2 shows rotors L on a linear drive LA. The linear drive LA is used to connect a first machine station MS1 and a second machine station MS2. The machine stations MS1, MS2 are each characterized by a region EB of influence, where the segments Seg that are assigned to the respective machine station MS1, MS2 form the region EB of influence of the respective machine station MS1, MS2. The movement of the rotors L is preferably controlled in a closed-loop manner in the region EB of influence of the machine stations MS1, MS2. The closed-loop control is performed with the aid of the control device SE and/or the corresponding control unit U.

The machine stations MS1, MS2 are constructed such that they process a plurality of workpieces/materials for machining WS on a plurality of rotors L in one working step. After the processing of the workpieces WS, the rotors L are guided out of the region of influence of the machine station MS1. In the second machine station MS2, a tool W is used to process a plurality of workpieces WS.

After the three rotors L have been output from the first machine station MS1, the intended number of five rotors L are ready in the region between the first machine station MS1 and the second machine station MS2, which can be transferred into the region of influence of the second machine station MS2.

These five rotors L are then transferred into the region EB of influence of the second machine station MS2, as soon as the other five rotors L, which are already located in the region EB of influence of the second machine station MS2, have left the station.

The movements of the respective rotors L within the region EB of influence of the respective machine station MS1, MS2 are specified by the corresponding movement profiles BP. The movement profile BP of the respective machine station MS1, MS2 can be oriented to the movements of the processing means, in particular of the tools W.

Instead of the segments Seg between the respective regions EB of influence of the machine stations MS1, MS2, a conveyor belt or a plurality of conveyor belts can also perform the transport of the rotors L.

Figure 3:
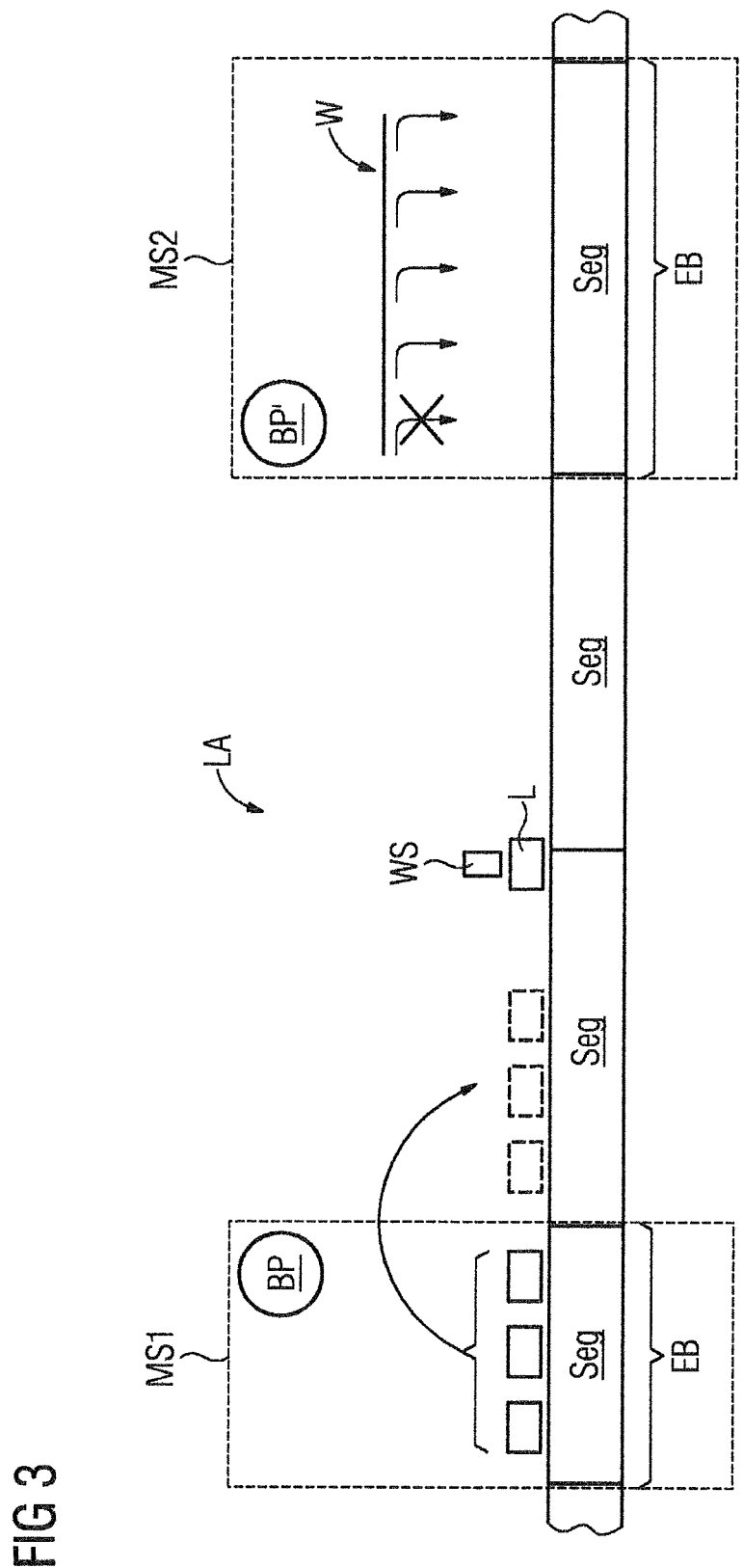
FIG. 3 shows a linear drive and two machine stations in accordance with the invention.

FIG. 3 also shows a linear drive LA and two machine stations MS1, MS2. The configuration corresponds essentially to the configuration shown in FIG. 2. After the three rotors L have been output from the first machine station MS1, however, only a reduced number of four rotors L are located between the regions EB of influence of the machine stations MS1, MS2. Only a reduced number of four rotors L is thus available for the second machine station MS2. In order not to stop production in spite of the reduced number of rotors L (four instead of the five intended), the reduced number of four rotors L is transferred into the region EB of influence of the machine station MS2. The four rotors L are moved in the region EB of influence of the second machine station MS2 in accordance with a modified movement profile BP'.

The mode of operation and/or the movement of the processing means W can also be influenced for this purpose, as is indicated by the first curved arrow being crossed out.

Figure 4:
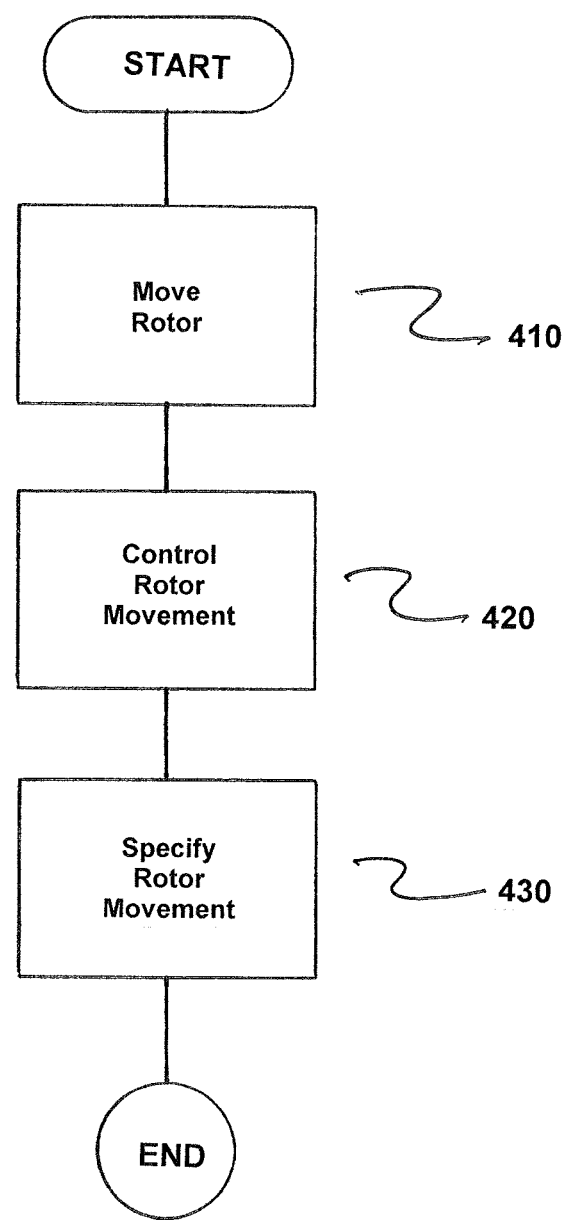
FIG. 4 is a flowchart of the method in accordance with the invention.

FIG. 4 is a flowchart of a method for open-loop or closed-loop control of a linear drive LA including at least one segment Seg, at least one rotor L, at least one machine station MS1, MS2 and a control device SE. The method comprises moving the at least one rotor L in a direction x via the at least one segment Seg, as indicated in step 410. In accordance with the invention, at least a portion of at least one segment Seg is within a region EB of influence of the at least one machine station MS1, MS2.

Next, the movement of the at least one rotor L is controlled in either an open-loop and/or closed-loop manner by either (i) the control device SE and/or (ii) a control unit U, as indicated in step 420. Here, the controlling occurs in according with a movement pattern BA for the rotor L.

Next, the movement of the at least one rotor L within the region EB of influence of an associated machine station MS1, MS2 is specified by a movement profile BP in accordance with a mode of operation of the associated machine station MS1, MS2, as indicated in step 430.

In summary, the disclosed embodiments of the invention relate to a method for open-loop and/or closed-loop control of a linear drive LA, the linear drive LA, and a system. The linear drive LA has at least one segment Seg, at least one rotor L, at least one machine station MS1, MS2 and a control device SE, where the at least one rotor L is moved in a direction x using the at least one segment Seg, where at least a portion of at least one segment Seg is in a region EB of influence of the machine station MS1, MS2, where the movement of the at least one rotor L is controlled in an open-loop and/or closed-loop manner by the control device SE and/or a control unit U, where the controlling occurs in accordance with a movement pattern BA for the rotor L, and where the movement of the particular rotor L in the region EB of influence of the associated machine station MS1, MS2 is specified by a movement profile BP in accordance with the mode of operation of the associated machine station MS1, MS2.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for one of open-loop and closed-loop control of a linear drive comprising at least one segment, at least one rotor, at least one machine station and a control device, the method comprising:
    moving the at least one rotor in a direction via the at least one segment, at least a portion of at least one segment being within a region of influence of the at least one machine station;
    controlling the movement of the at least one rotor in at least one of an open-loop and closed-loop manner by at least one of (i) the control device and (ii) a control unit, said controlling occurring in according with a movement pattern for the rotor; and
    specifying the movement of the at least one rotor within the region of influence of an associated machine station by a movement profile in accordance with a mode of operation of the associated machine station;
    wherein a plurality of rotors are transferred together into the region of influence of the associated machine station.

2. The method as claimed in claim 1, wherein a respective movement profile is specified by one of (i) the control device and (ii) the associated machine station.

3. The method as claimed in claim 1, wherein the movement of the at least one rotor is specified by the control device.

4. The method as claimed in claim 1, wherein the movement of the at least one rotor is determined during operation of the linear drive.

5. The method as claimed in claim 1, wherein determination of the movement pattern is performed by the control device, wherein the movement pattern is implemented through at least the following steps:
    a) determining an available number of rotors which are available for the associated machine station,
    b) determining a capability of the associated machine station to accept an intended number of rotors,
    c) if the available number of rotors is at least as great as the intended number of rotors, the transfer the intended number of rotors into the region of influence of the associated machine station,
    d) working through the movement profile of the rotors in the region of influence of the associated machine station,
    e) transferring the rotors are out of the region of influence of the associated machine station after the movement profile has been worked through.

6. The method as claimed in claim 5, wherein a reduced number of rotors is transferred in step c) into the region of influence of the machine station if a predetermined waiting time has elapsed, and wherein, in step d), a modified movement profile is performed by the rotors.

7. The method as claimed in claim 6, wherein the modified movement profile depends on a reduced number of rotors which are transferred into the region of influence of the associated machine station.

8. The method as claimed in claim 5, wherein the modified movement profile depends on a reduced number of rotors which are transferred into the region of influence of the respective machine station.

9. The method as claimed in claim 1, wherein the region of influence of the machine station is specified by segments which are assigned to the associated machine station.

10. The method as claimed in claim 1, wherein the rotors are collected outside the region of influence of the associated machine station.

11. The method as claimed in claim 1, further comprising:
    assigning a succession of machine stations to respective rotors;
    wherein the succession indicates a sequence in which the respective rotors pass through the at least one machine station.

12. A control device for a linear drive, comprising:
    a processor; and
    memory;
    wherein the control device is configured to provide at least one of (i) open-loop and (ii) closed-loop control by:

moving the at least one rotor in a direction via the at least one segment, at least a portion of at least one segment being within a region of influence of the at least one machine station;

controlling the movement of the at least one rotor in at least one of an open-loop and closed-loop manner by at least one of (i) the control device and (ii) a control unit, said controlling occurring in according with a movement pattern for the rotor; and specifying the movement of the at least one rotor within the region of influence of an associated machine station by a movement profile in accordance with a mode of operation of the associated machine station;

wherein a plurality of rotors are transferred together into the region of influence of the associated machine station.

13. A linear drive comprising at least one segment, one or more rotors and the control device as claimed in claim 12.

14. A system comprising at least one machine station and the linear drive as claimed in claim 13.

15. The system as claimed in claim 14, wherein the system comprises one of (i) a machine tool, (ii) a production machine and (iii) packaging machine.

* * * * *